(12) United States Patent
Ito

(10) Patent No.: US 7,769,210 B2
(45) Date of Patent: Aug. 3, 2010

(54) BIOMETRIC AUTHENTICATION DEVICE

(75) Inventor: Kimikazu Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 827 days.

(21) Appl. No.: 11/711,762

(22) Filed: Feb. 28, 2007

(65) Prior Publication Data

US 2008/0077359 A1    Mar. 27, 2008

(30) Foreign Application Priority Data

Sep. 22, 2006    (JP) .......................... 2006-258039

(51) Int. Cl.
*G06K 9/00* (2006.01)
(52) U.S. Cl. .................................... 382/115
(58) Field of Classification Search ................ None
See application file for complete search history.

(56) References Cited

U.S. PATENT DOCUMENTS

| | | | |
|---|---|---|---|
| 4,724,542 A * | 2/1988 | Williford | 382/119 |
| 2003/0068072 A1* | 4/2003 | Hamid | 382/124 |
| 2004/0086157 A1 | 5/2004 | Sukegawa | |
| 2005/0053264 A1* | 3/2005 | Amano et al. | 382/115 |
| 2006/0215883 A1* | 9/2006 | Kim et al. | 382/115 |
| 2007/0110283 A1* | 5/2007 | Hillhouse et al. | 382/115 |

FOREIGN PATENT DOCUMENTS

| | | |
|---|---|---|
| JP | 60-072067 A | 4/1985 |
| JP | 63-276681 A | 11/1988 |
| JP | 11-25268 A | 1/1999 |
| JP | 2001-22377 A | 1/2001 |
| JP | 2004-157602 A | 6/2004 |
| JP | 2005-63297 A | 3/2005 |

\* cited by examiner

*Primary Examiner*—Brian P Werner
(74) *Attorney, Agent, or Firm*—Westerman, Hattori, Daniels & Adrian, LLP

(57) ABSTRACT

In a biometric authentication device that includes biometric-authentication-data generating means for generating biometric authentication data from biometric data of a user, and authentication means for performing authentication of the biometric authentication data on the basis of reference biometric data of the user, a matching ratio of the reference biometric data and updated and registered second reference biometric data is calculated, and the user is requested to re-register the reference biometric data and the second reference biometric data when the matching ratio is lower than a predetermined threshold value.

15 Claims, 18 Drawing Sheets

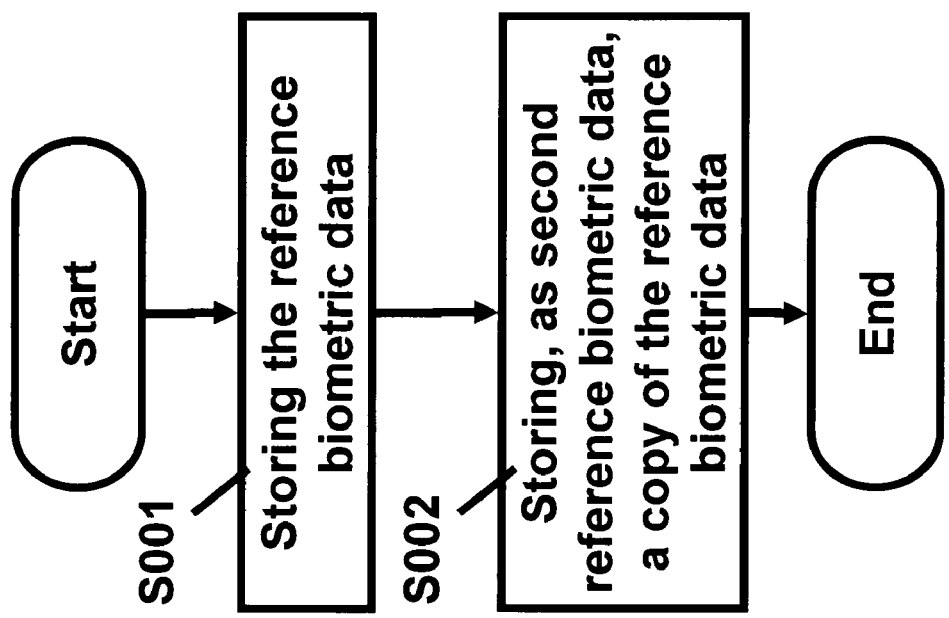

| Number | Reference Biometric Data | Second Reference Biometric Data | Matching Ratio | Reference Biometric Data Matching Ratio | Date |
|---|---|---|---|---|---|
| 1 | Data1 | Data1 | 99.9 | 100.0 | 2001.01.08 |
| 2 | Data1 | Data1 | 99.8 | 100.0 | 2001.01.15 |
| 3 | Data1 | Data2 | 99.9 | 99.9 | 2001.01.22 |
| 4 | Data1 | Data3 | 99.8 | 99.8 | 2001.01.29 |
| 5 | Data1 | Data3 | 99.6 | 99.8 | 2001.02.03 |
| 6 | Data1 | Data5 | 99.9 | 99.5 | 2001.02.09 |
| 7 | Data1 | Data6 | 99.8 | 99.3 | 2001.02.16 |
| 8 | Data1 | Data7 | 99.8 | 99.0 | 2001.02.21 |
| 9 | Data8 | Data8 | 99.9 | 100.0 | 2001.03.21 |

Fig.11

| Number | 1 | 2 | 3 |
|---|---|---|---|
| 1 | 94.0 | 93.0 | — |
| 2 | 65.0 | 73.0 | 68.0 |
| 3 | 71.0 | — | — |

Fig. 12

| Number 402 | Reference Biometric Data 404 | Second Reference Biometric Data 406 | Matching Ratio 408 | Reference Biometric Data Matching Ratio 410 | Date 412 |
|---|---|---|---|---|---|
| 1 | Data1 | Data1 | 99.9 | 100.0 | 2001.01.08 |
| 2 | Data1 | Data1 | 99.7 | 100.0 | 2001.01.15 |
| 3 | Data1 | Data1 | 99.5 | 100.0 | 2001.01.22 |
| 4 | Data1 | Data1 | 99.3 | 100.0 | 2001.01.29 |
| 5 | Data1 | Data5 | 99.0 | 100.0 | 2001.02.03 |
| 6 | Data1 | Data5 | 99.9 | 99.0 | 2001.02.09 |
| 7 | Data1 | Data5 | 99.4 | 99.0 | 2001.02.16 |
| 8 | Data1 | Data8 | 99.0 | 99.0 | 2001.02.21 |
| 9 | Data8 | Data8 | 99.9 | 100.0 | 2001.03.21 |

Fig.13

| 402 | 404 | 406 | 408 | 410 | 412 |
|---|---|---|---|---|---|
| Number | Reference Biometric Data | Second Reference Biometric Data | Matching Ratio | Reference Biometric Data Matching Ratio | Date |
| 1 | Data1 | Data1 | 99.9 | 100.0 | 2001.01.08 |
| 2 | Data1 | Data1 | 99.5 | 100.0 | 2001.01.15 |
| 3 | Data1 | Data1 | 99.1 | 100.0 | 2001.01.22 |

Fig.14

BIOMETRIC AUTHENTICATION DEVICE

BACKGROUND OF THE INVENTION

1. Field of the Invention

The present invention relates to a biometric authentication device that performs biometric authentication by comparing biometric data of a user with the reference biometric data of the user.

2. Description of the Related Art

Biometric data is said to be less prone to vary with time. However, biometric data may vary with age. Biometric data is considered to vary with time in an early age when the body grows rapidly, for example, elementary school days. When biometric data of a user varies with time, the matching ratio of the biometric data and the reference biometric data decreases. Thus, a problem arises in that the user may not be accepted by biometric authentication even when the user is a genuine user.

Hitherto, various types of technique have been proposed to support a change in biometric data over time. Exemplary techniques for updating and registering reference biometric data are described in Japanese Unexamined Patent Application Publication Nos. 60-072067 and 2004-157602.

However, when reference biometric data is repeatedly updated and registered, the reference biometric data may significantly differ from that was initially registered. Thus, a risk that a stranger pretends to be a person corresponding to the reference biometric data and is improperly authenticated as the person may arise.

SUMMARY OF THE INVENTION

It is an object of the present invention to provide biometric authentication in which security is assured even when reference biometric data is updated and registered according to a change in biometric data of a user over time.

A biometric authentication device according to a first aspect of the present invention includes biometric-authentication-data generating means for generating biometric authentication data from biometric data of a user, and authentication means for performing authentication of the biometric authentication data on the basis of reference biometric data of the user. The biometric authentication device further includes storage means for storing the reference biometric data and second reference biometric data (i.e. working reference biometric data) that is obtained by copying the reference biometric data, update-and-registration means for updating the second reference biometric data with the biometric authentication data and registering the updated second reference biometric data when the authentication means determines that authentication has been successfully completed, and re-registration request means for calculating a matching ratio of the reference biometric data and the updated and registered second reference biometric data and requesting the user to re-register the reference biometric data and the second reference biometric data when the matching ratio is equal to or lower than a predetermined value.

A biometric authentication device according to a second aspect of the present invention includes biometric-authentication-data generating-means for generating biometric authentication data from biometric data of a user, and authentication means for performing authentication of the biometric authentication data on the basis of reference biometric data of the user. The biometric authentication device further includes storage means for storing the reference biometric data and second reference biometric data that is obtained by copying the reference biometric data, and update-and-registration means. When the authentication means determines, on the basis of a first matching ratio of the biometric authentication data and the second reference biometric data, that authentication has been successfully completed and when a second matching ratio of biometric authentication data generated in the preceding authentication and the biometric authentication data is higher than the first matching ratio, the first and second matching ratios being calculated by the authentication means, the update-and-registration means updates the second reference biometric data with the biometric authentication data generated in the preceding authentication and registers the updated second reference biometric data. The biometric authentication device further includes re-registration request means for calculating a third matching ratio of the reference biometric data and the updated and registered second reference biometric data and requesting the user to re-register the reference biometric data and the second reference biometric data when the third matching ratio is equal to or lower than a predetermined value.

A biometric authentication method according to a third aspect of the present invention includes a biometric-authentication-data generating step of generating biometric authentication data from biometric data of a user, and an authentication step of performing authentication of the biometric authentication data on the basis of reference biometric data of the user. The biometric authentication method further includes a storage step of storing the reference biometric data and second reference biometric data that is obtained by copying the reference biometric data in storage means, an update-and-registration step of updating the second reference biometric data with the biometric authentication data and registering the updated second reference biometric data when the authentication step determines that authentication has been successfully completed, and a re-registration request step of calculating a matching ratio of the reference biometric data and the updated and registered second reference biometric data and requesting the user to re-register the reference biometric data and the second reference biometric data when the matching ratio is equal to or lower than a predetermined value.

A biometric authentication method according to a fourth aspect of the present invention includes a biometric-authentication-data generating step of generating biometric authentication data from biometric data of a user, and an authentication step of performing authentication of the biometric authentication data on the basis of reference biometric data of the user. The biometric authentication method further includes a storage step of storing the reference biometric data and second reference biometric data that is obtained by copying the reference biometric data in storage means, and an update-and-registration step. When the authentication step determines, on the basis of a first matching ratio of the biometric authentication data and the second reference biometric data, that authentication has been successfully completed and when a second matching ratio of biometric authentication data generated in the preceding authentication and the biometric authentication data is higher than the first matching ratio, the first and second matching ratios being calculated by the authentication step, the update-and-registration step updates the second reference biometric data with the biometric authentication data generated in the preceding authentication and registers the updated second reference biometric data. The biometric authentication method further includes a re-registration request step of calculating a third matching ratio of the reference biometric data and the updated and registered second reference biometric data and requesting the user to re-register the reference biometric data and the second reference biometric data when the third matching ratio is equal to or lower than a predetermined value.

A biometric authentication program according to a fifth aspect of the present invention causes a computer to perform a biometric-authentication-data generating step of generating biometric authentication data from biometric data of a user, and an authentication step of performing authentication of the biometric authentication data on the basis of reference biometric data of the user. The biometric authentication program further causes a computer to perform a storage step of storing the reference biometric data and second reference biometric data that is obtained by copying the reference biometric data in storage means, an update-and-registration step of updating the second reference biometric data with the biometric authentication data and registering the updated second reference biometric data when the authentication step determines that authentication has been successfully completed, and a re-registration request step of calculating a matching ratio of the reference biometric data and the updated and registered second reference biometric data and requesting the user to re-register the reference biometric data and the second reference biometric data when the matching ratio is equal to or lower than a predetermined value.

A biometric authentication program according to a sixth aspect of the present invention causes a computer to perform a biometric-authentication-data generating step of generating biometric authentication data from biometric data of a user, and an authentication step of performing authentication of the biometric authentication data on the basis of reference biometric data of the user. The biometric authentication program further causes a computer to perform a storage step of storing the reference biometric data and second reference biometric data that is obtained by copying the reference biometric data in storage means, and an update-and-registration step. When the authentication step determines, on the basis of a first matching ratio of the biometric authentication data and the second reference biometric data, that authentication has been successfully completed and when a second matching ratio of biometric authentication data generated in the preceding authentication and the biometric authentication data is higher than the first matching ratio, the first and second matching ratios being calculated by the authentication step, the update-and-registration step updates the second reference biometric data with the biometric authentication data generated in the preceding authentication and registers the updated second reference biometric data. The biometric authentication program further causes a computer to perform a re-registration request step of calculating a third matching ratio of the reference biometric data and the updated and registered second reference biometric data and requesting the user to re-register the reference biometric data and the second reference biometric data when the third matching ratio is equal to or lower than a predetermined value.

In the present invention, when a matching ratio of reference biometric data that is updated and registered and reference biometric data that was initially registered is lower than a predetermined threshold value, the user is requested to re-register the reference biometric data. Thus, the reference biometric data, which is updated and registered, can be prevented from significantly differing from that was initially registered, so that it can be guaranteed that a genuine user, the reference biometric data of the user having been initially registered, is authenticated. Accordingly, a stranger can be prevented from pretending to be a genuine user and being authenticated, so that security can be assured.

BRIEF DESCRIPTION OF THE DRAWINGS

FIG. 3 is a flowchart of preparation;
FIG. 11 shows a first biometric authentication data table;
FIG. 12 shows a biometric authentication failure table;
FIG. 13 shows a second biometric authentication data table;
FIG. 14 shows a third biometric authentication data table.

DESCRIPTION OF THE PREFERRED EMBODIMENTS

Embodiments according to the present invention will now be described with reference to the drawings. In the embodiments, a case will be described where biometric data of veins in a palm is used. Alternatively, biometric data of fingerprints, irises, or the like may be used.

First Embodiment

Hardware Block Diagram

Figure 1:
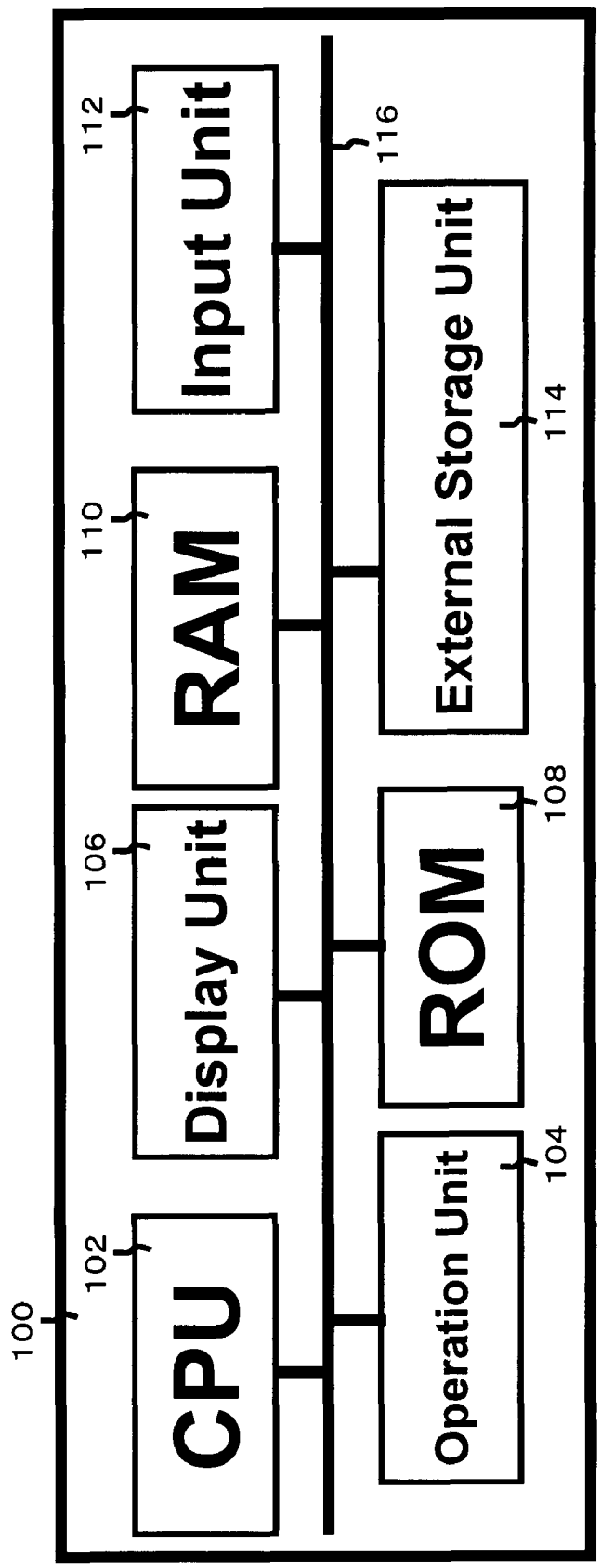
FIG. 1 shows an overall hardware configuration.

FIG. 1 is a simplified block diagram showing the hardware configuration of an exemplary biometric authentication device. A biometric authentication device 100 includes a central processing unit (CPU) 102, an operation unit 104, a display unit 106, a read only memory (ROM) 108, a random access memory (RAM) 110, an input unit 112, and an external storage unit 114. These components are connected to each other with a bus 116. The CPU 102 performs various types of operation. The operation unit 104 accepts data entered by a user. The display unit 106 displays various types of information. The ROM 108 stores various types of program, for example, an operating system (OS). The RAM 110 is used to, for example, execute programs and store data. The input unit 112 reads biometric data of a user in the form of an image. The external storage unit 114 stores a biometric authentication program, reference biometric data of users, and the like. When a user issues instructions to perform biometric authentication from the operation unit 104, the CPU 102 performs control so as to display a message on the display unit 106 to prompt the user to enter biometric data of the user using the input unit 112. The input unit 112 reads the biometric data of the user in the form of an image. Then, the CPU 102 performs control so as to read a biometric authentication program from the external storage unit 114 and load the program into the RAM 110 to execute the program. The biometric authentication program generates biometric authentication data from the image of the biometric data read by the input unit 112 and performs biometric authentication by comparing the biometric authentication data with the reference biometric data of the user.

Functional Block Diagram

Figure 2:
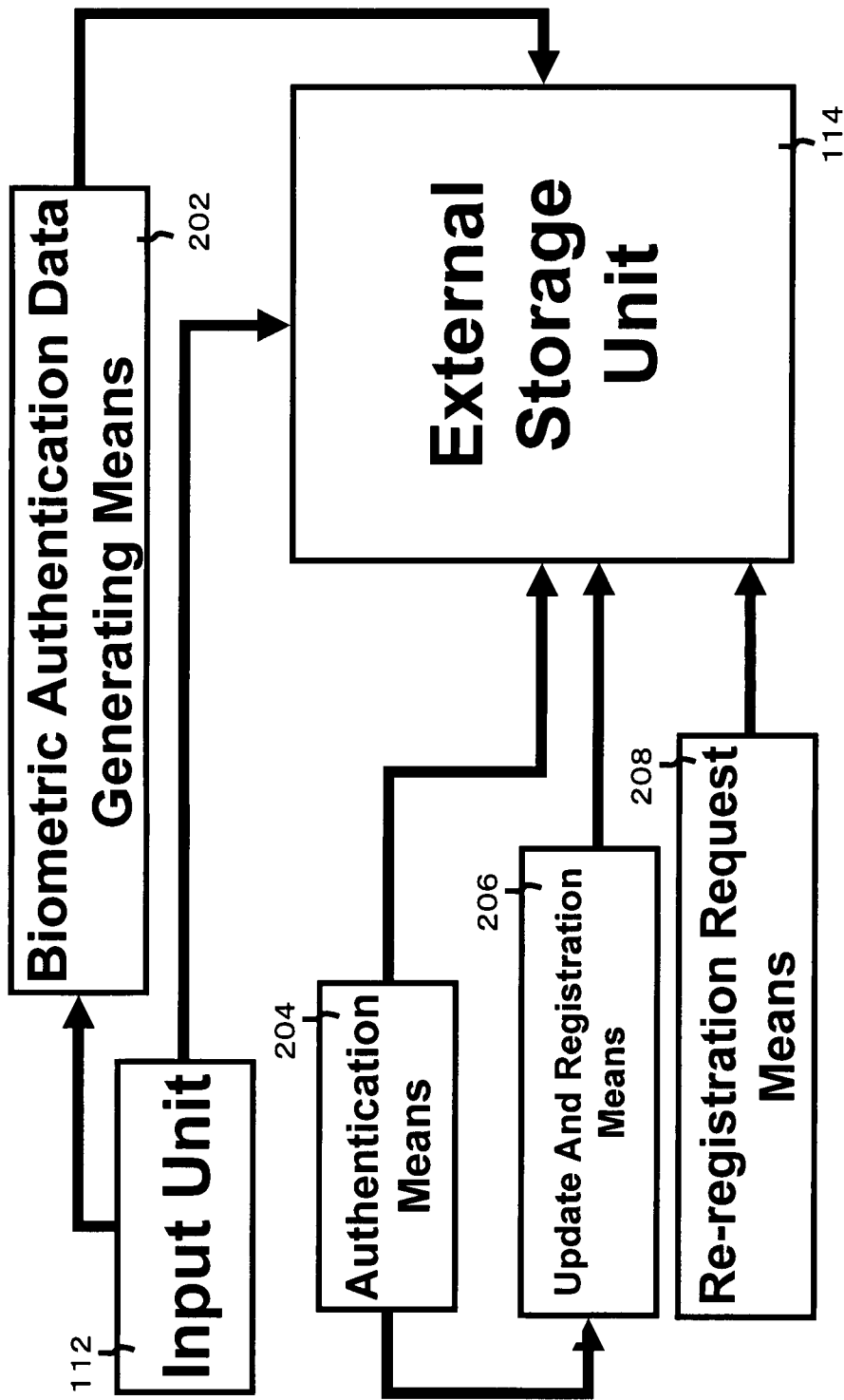
FIG. 2 is a functional block diagram of an authentication function.

FIG. 2 is a simplified functional block diagram showing an exemplary biometric authentication function. The biometric authentication function includes the input unit 112, the external storage unit 114, biometric-authentication-data generating means 202, authentication means 204, update-and-registration means 206, and re-registration request means 208. These components will now be described.

Input Unit

The input unit 112 reads an image of veins in a palm of a user as biometric data of the user. Then, the input unit 112 sends instructions to the biometric-authentication-data generating means 202 to generate biometric authentication data from the read image of the veins in the palm.

Biometric-Authentication-Data Generating Means

The biometric-authentication-data generating means 202 extracts feature points and the like from the image of the veins in the palm read by the input unit 112 and generates biometric authentication data that is used when the authentication means 204 performs biometric authentication.

External Storage Unit

The external storage unit 114 stores the biometric authentication data generated by the biometric-authentication-data generating means 202. The external storage unit 114 further stores reference biometric data of users that is used when the authentication means 204 performs biometric authentication.

Authentication Means

The authentication means 204 calculates the matching ratio of the biometric authentication data generated by the biometric-authentication-data generating means 202 and reference biometric data of a user. In this case, the matching ratio represents the degree of agreement between the biometric authentication data and the reference biometric data. Then, the authentication means 204 determines whether authentication has been successfully completed by checking whether the matching ratio is equal to or higher than a predetermined threshold value. When the authentication means 204 determines that the authentication has been successfully completed, the authentication means 204 generates a biometric authentication data table 300 and stores the biometric authentication data table 300 in the external storage unit 114. In the biometric authentication data table 300, the matching ratio is associated with a date when the authentication means 204 determines that the authentication has been successfully completed, and other items of data. On the other hand, when the authentication means 204 determines that the authentication has failed, the authentication means 204 generates a biometric authentication failure table 302 and stores the biometric authentication failure table 302 in the external storage unit 114. In the biometric authentication failure table 302, the matching ratio is associated with the number of times authentication failed. The detailed process performed by the authentication means 204 is described below with reference to FIG. 5.

Biometric Authentication Data Table

FIG. 11 shows an example of the biometric authentication data table 300, in which a matching ratio is associated with a date when it was determined that authentication was successfully completed, and other items of data. A number-of-authentication 402 represents the number of times the authentication means 204 determined that authentication was successfully completed. Reference biometric data 404 represents reference biometric data of a user. The user registers the reference biometric data 404 when the user starts using the biometric authentication device 100. Second reference biometric data 406 (i.e. working reference biometric data 406) represents reference data of the user that is used when the authentication means 204 performs biometric authentication. The update-and-registration means 206, which is described below, updates and registers the second reference biometric data 406 on predetermined conditions. A matching ratio 408 represents the degree of agreement between biometric authentication data and second reference biometric data, which is calculated by the authentication means 204. A reference-biometric-data matching ratio 410 represents the degree of agreement between the reference biometric data 404 and the second reference biometric data 406, which is calculated by the re-registration request means 208, which is described below. A date 412 represents a date when the authentication means 204 determined that authentication was successfully completed. In FIG. 11, for example, when the authentication means 204 determined for the sixth time that authentication was successfully completed, the reference biometric data 404 and the second reference biometric data are Data1 and Data5, respectively. Furthermore, the matching ratio 408 of biometric authentication data generated by the biometric-authentication-data generating means 202 and the second reference biometric data is 99.9%, the reference-biometric-data matching ratio 410 of the reference biometric data 404 and the second reference biometric data, which is calculated by the re-registration request means 208, is 99.5%, and the date 412 when the authentication means 204 determined that the authentication was successfully completed is 2001.02.09. In FIG. 11, only year, month, and day are described as the date 412. In addition, time may be described.

Biometric Authentication Failure Table

Figure 12:
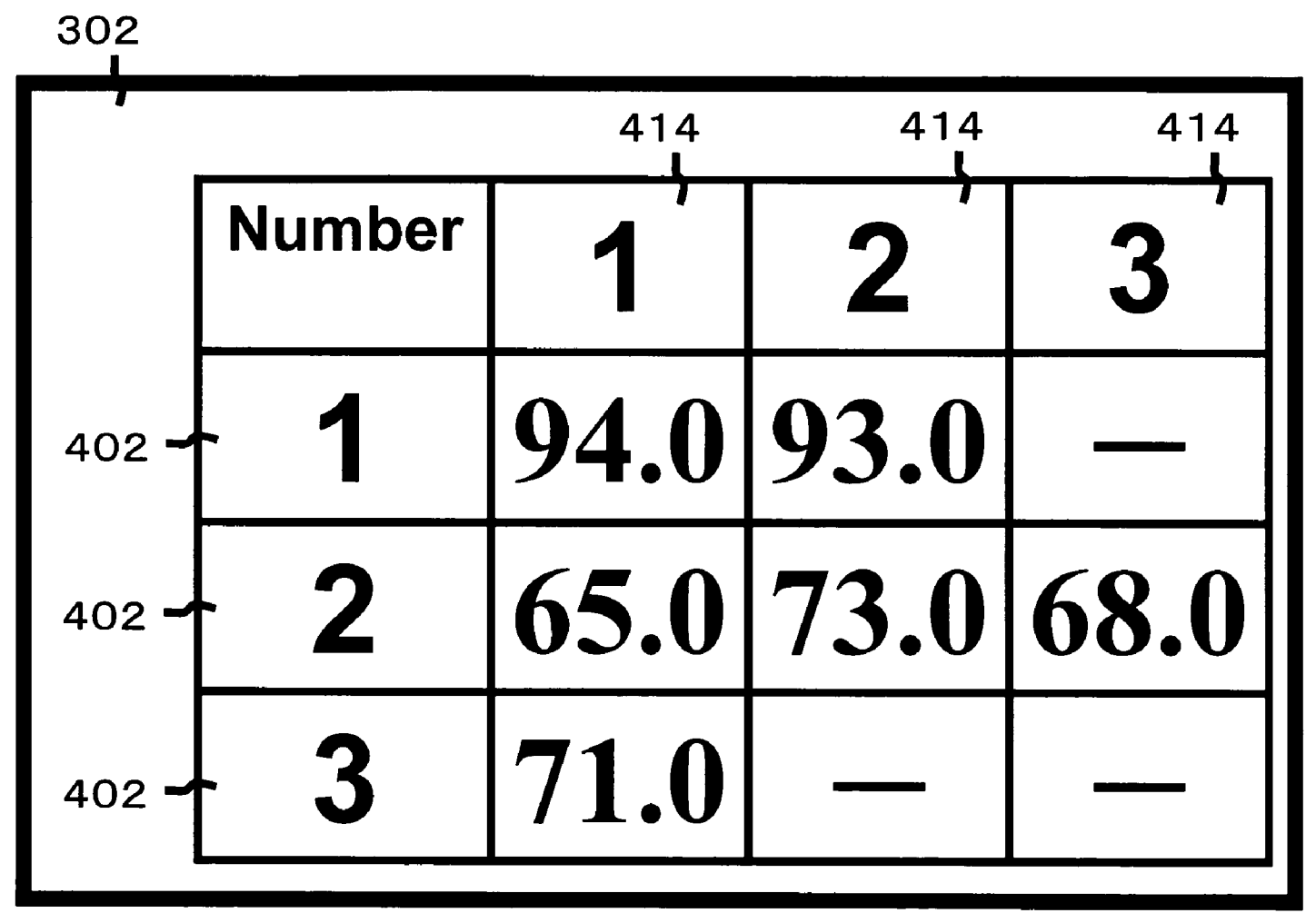

FIG. 12 shows an example of the biometric authentication failure table 302, in which the authentication means 204 links the matching ratio 408, the number-of-authentication 402, and a number-of-verification 414. In the biometric authentication failure table 302, each of the numbers described in vertical columns represents the number-of-authentication 402, and each of the numbers described in horizontal columns represents the number-of-verification 414. The number-of-verification 414 represents the number of times the authentication means 204 calculated the matching ratio of biometric authentication data and second reference biometric data. The authentication means 204 obtains the number of times verification failed with reference to the biometric authentication failure table 302. When the number of times verification failed is equal to or less than a predetermined number of times, the authentication means 204 reattempts to perform verification. The number of the columns of the number-of-verification 414 represents an allowable number of verification failure. Although the allowable number of verification failure is set to three in FIG. 12, the user can set the allowable number of verification failure to any number. In FIG. 12, in the first authentication, the matching ratios are 94.0% for the first verification and 93.0% for the second verification, and no matching ratio is described for the third verification. Thus, it is determined that the first authentication was successfully completed when the third verification was performed. Furthermore, in the second authentication, the matching ratios are 65.0% for the first verification, 73.0% for the second verification, and 68.0% for the third verification. Thus, it is determined that the second authentication failed. Furthermore, in the third authentication, the matching ratio is 71.0% for the first verification, and no matching ratio is described for the second verification. Thus, it is determined that the third authentication was successfully completed when the second verification was performed. In this embodiment, the matching ratio is described in the biometric authentication failure table 302. Instead of the matching ratio, a character string "NG" may be described.

Update-and-Registration Means

Figure 6:
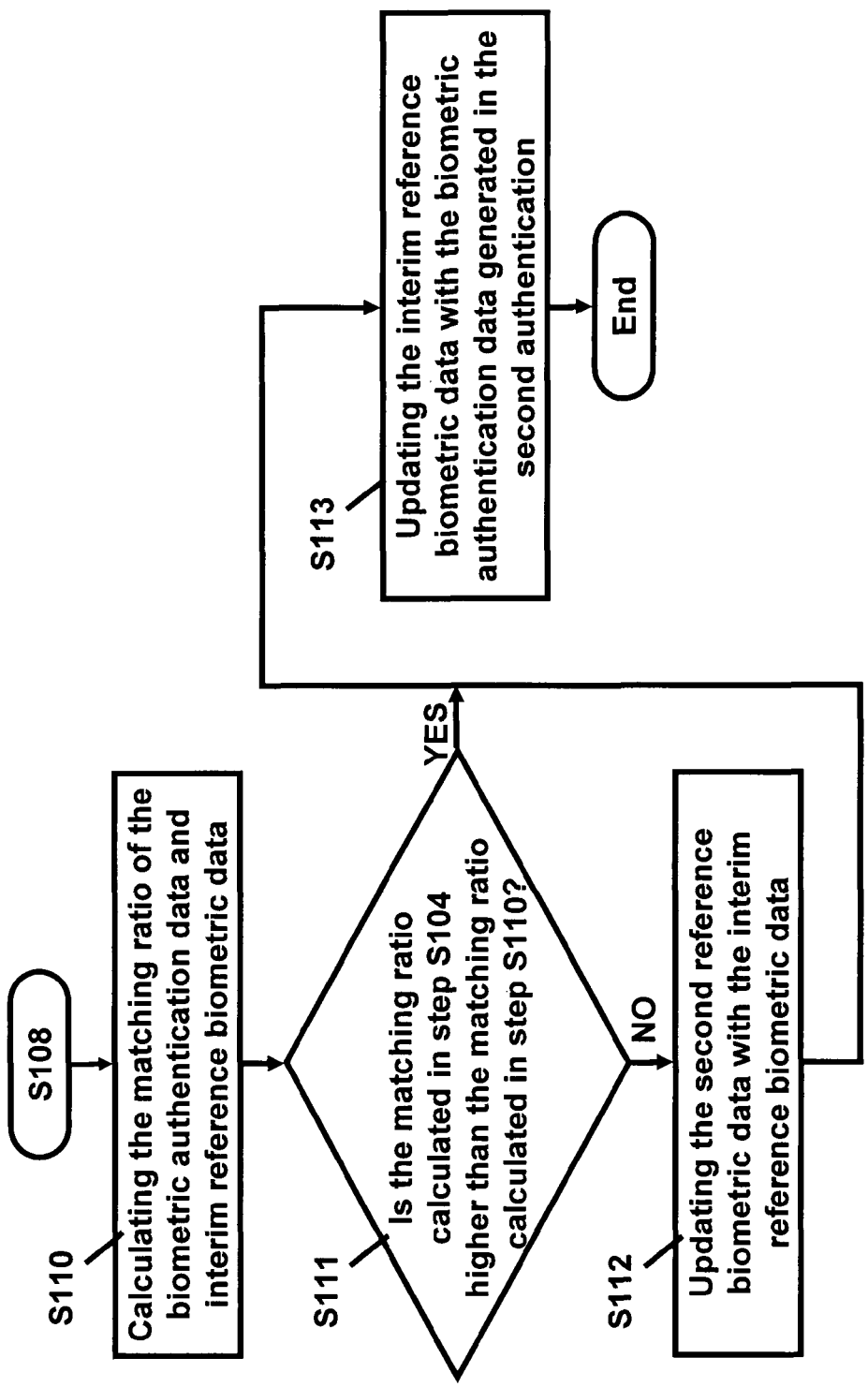
FIG. 6 is a flowchart of the process of the second authentication.
Figure 9:
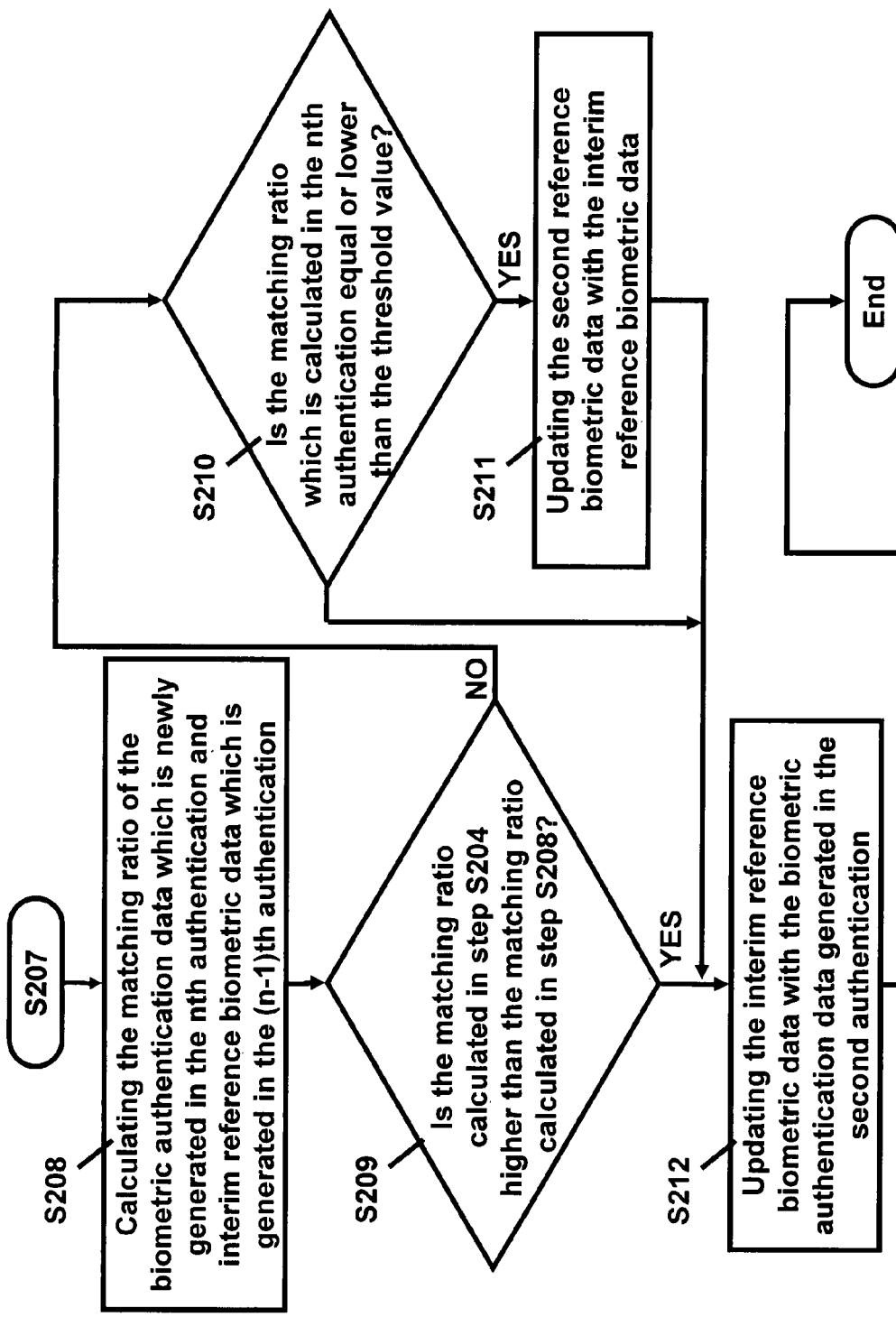
FIG. 9 is a second flowchart of the nth authentication.

The update-and-registration means 206 updates and registers biometric authentication data generated by the biometric-authentication-data generating means 202 as second reference biometric data on predetermined conditions. The detailed process performed by the update-and-registration means 206 is described below with reference to FIGS. 6 and 9.

Re-Registration Request Means

Figure 10:
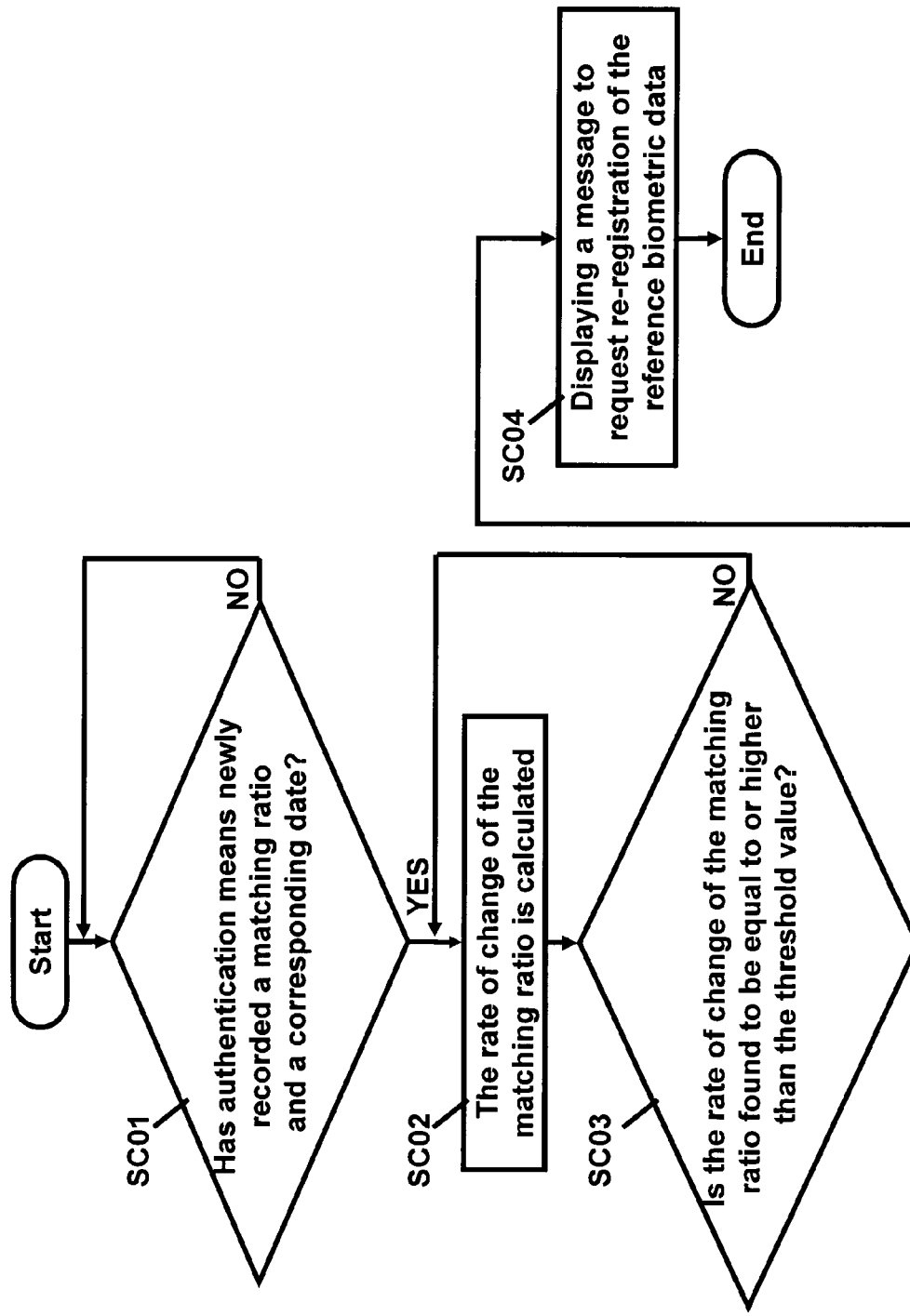
FIG. 10 is a detailed flowchart of a second process of sending a re-registration notice.

The re-registration request means 208 calculates the reference-biometric-data matching ratio of reference biometric data and second reference biometric data with reference to the biometric authentication data table 300. Then, when the reference-biometric-data matching ratio is equal to or lower than a predetermined threshold value, the re-registration request means 208 requests the user to re-register the reference biometric data. Alternatively, the re-registration request means 208 may calculate the rate of change of the matching ratio with reference to the biometric authentication data table 300, and may request the user to re-register the reference biometric data when the rate of change of the matching ratio is equal to or higher than a predetermined threshold value. The detailed process performed by the re-registration request means 208 is described below with reference to FIGS. 7 and 10.

Flow of Preparation

The process of initial registration of reference biometric data of a user will now be described with reference to FIGS. 3 and 15. The reference biometric data is referred to when verification is performed.

Figure 15:
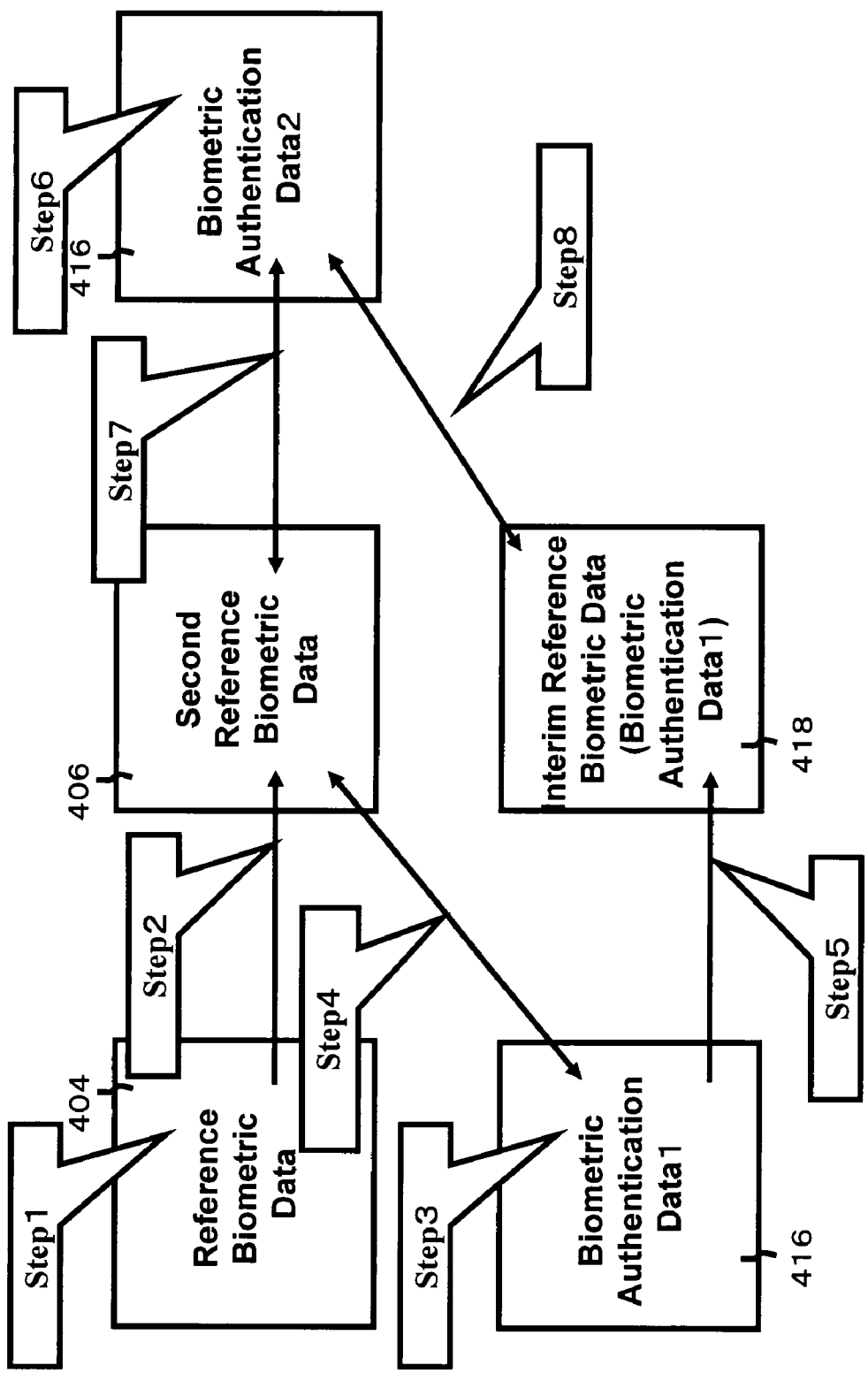
FIG. 15 is a first diagram showing the process of updating and registering second reference biometric data (i.e. working reference biometric data)

In step S001, the biometric-authentication-data generating means 202 generates reference biometric data of a user that is referred to when verification is performed from an image of veins in a palm of the user read by the input unit 112, and stores the reference biometric data in the external storage unit 114 (step 1 in FIG. 15). Then, the process proceeds to step S002.

In step S002, the biometric-authentication-data generating means 202 stores, as second reference biometric data, a copy of the reference biometric data in the external storage unit 114 (step 2 in FIG. 15). Then, the process is completed.

In this embodiment, the second reference biometric data is used as actual reference biometric data when biometric authentication is performed. Biometric authentication data generated by the biometric-authentication-data generating means 202 is updated and registered as the second reference biometric data on predetermined conditions. In this arrangement, when biometric data of a user varies with time, corresponding reference biometric data is updated. Thus, the matching ratio of newly generated biometric authentication data and the second reference biometric data can be prevented from decreasing. Accordingly, the frequency of causing troubles to the user because of authentication failure due to a change in biometric data over time decreases.

However, when reference biometric data is repeatedly updated and registered, the reference biometric data may significantly differ from biometric data that was initially registered. Thus, a risk that a stranger pretends to be a person corresponding to the reference biometric data and is improperly authenticated as the person may arise. In this embodiment, in order to reduce this risk, two types of data are prepared: reference biometric data and second reference biometric data. In this arrangement, when the reference-biometric-data matching ratio is equal to or lower than a predetermined threshold value, the user is requested to re-register the reference biometric data. The reference-biometric-data matching ratio represents the degree of agreement between the second reference biometric data, which is updated and registered, and the reference biometric data, which was initially registered. When the user sends a request to re-register the reference biometric data, the aforementioned process is repeated, so that the biometric-authentication-data generating means 202 generates new reference biometric data and second reference biometric data obtained by copying the new reference biometric data, and stores these pieces of data in the external storage unit 114.

First Half of Flow of Initial Authentication

The process performed by the biometric authentication device when the user is authenticated for the first time will now be described with reference to FIGS. 4A and 4B.

In step S101, when the user sends a notice to request biometric authentication by operating the operation unit 104, the display unit 106 determines whether the re-registration request means 208 has sent a request to re-register reference biometric data. When the display unit 106 determines that the re-registration request means 208 has sent a request to re-register the reference biometric data, the process proceeds to step S102. In step S102, the re-registration request means 208 displays a message on the display unit 106, which requests re-registration of the reference biometric data. On the other hand, when the display unit 106 determines that the re-registration request means 208 has not sent a request to re-register the reference biometric data, the process proceeds to step S103. The process performed by the re-registration request means 208 is described below with reference to FIG. 7.

In step S103, the biometric-authentication-data generating means 202 generates biometric authentication data that is used when verification is performed from an image of biometric data entered by the user from the input unit 112 (step 3 in FIG. 15), and stores the biometric authentication data in the external storage unit 114. In this embodiment, the biometric authentication data is stored in the external storage unit 114. Alternatively, the biometric authentication data may be stored in, for example, the RAM 110. The process proceeds to step S104.

In step S104, the authentication means 204 performs biometric authentication and determines whether the authentication has been successfully completed. The process of determining it step S104 whether the authentication has been successfully completed will now be described in detail with reference to FIG. 5.

Determination on Whether Authentication has been Successfully Completed

In step SA01, the authentication means 204 calculates the matching ratio of the biometric authentication data of the user generated in step S103 and second reference biometric data of the user stored in the external storage unit 114 (step 4 in FIG. 15). Then, the process proceeds to step SA02.

In step SA02, the authentication means 204 compares the matching ratio calculated in step SA01 with a threshold value set by the user, and determines whether the matching ratio is equal to or higher than the threshold value. The threshold value set by the user is a value that is set to determine that authentication has been successfully completed when the matching ratio is equal to or higher than the threshold value. The user sets the threshold value on the basis of a required security level. When the authentication means 204 determines that the matching ratio is equal to or higher than the threshold value, the process proceeds to step SA03 where the authentication means 204 determines that the authentication has been successfully completed. Then, the process proceeds to step S106 in FIG. 4A where the authentication means 204 displays a message on the display unit 106, which states that the authentication has been successfully completed. On the other hand, when the authentication means 204 determines that the matching ratio is lower than the threshold value, the process proceeds to step SA04.

In step SA04, the authentication means 204 records the matching ratio calculated in step SA01 in the biometric authentication failure table 302. Then, the process proceeds to step SA05.

In step SA05, the authentication means 204 determines whether verification has been performed predetermined times with reference to the biometric authentication failure table 302. The authentication means 204 determines that verification has been performed the predetermined times when a matching ratio is described in a column for the third verification in the biometric authentication failure table 302. Verification can be performed the predetermined times for the following reason: For example, in a case where the matching ratio of generated biometric authentication data and second reference biometric data is low because the way the user holds the palm over the input unit 112 is inappropriate, when it is determined immediately that authentication has failed, the user feels troubled. When the authentication means 204 determines that verification has been performed the predetermined times, the process proceeds to step SA06 where the authentication means 204 determines that the authentication has failed. Then, the process proceeds to step S105 in FIG. 4A where the authentication means 204 displays a message on the display unit 106, which states that the authentication has failed. On the other hand, when the authentication means 204 determines that verification has not been performed the predetermined times, the process goes back to step S103 in FIG. 4A, and the user is requested to hold the palm over the input unit 112 again. Then, the aforementioned process is repeated to perform biometric authentication.

Second Half of Flow of Initial Authentication

Figure 4A:
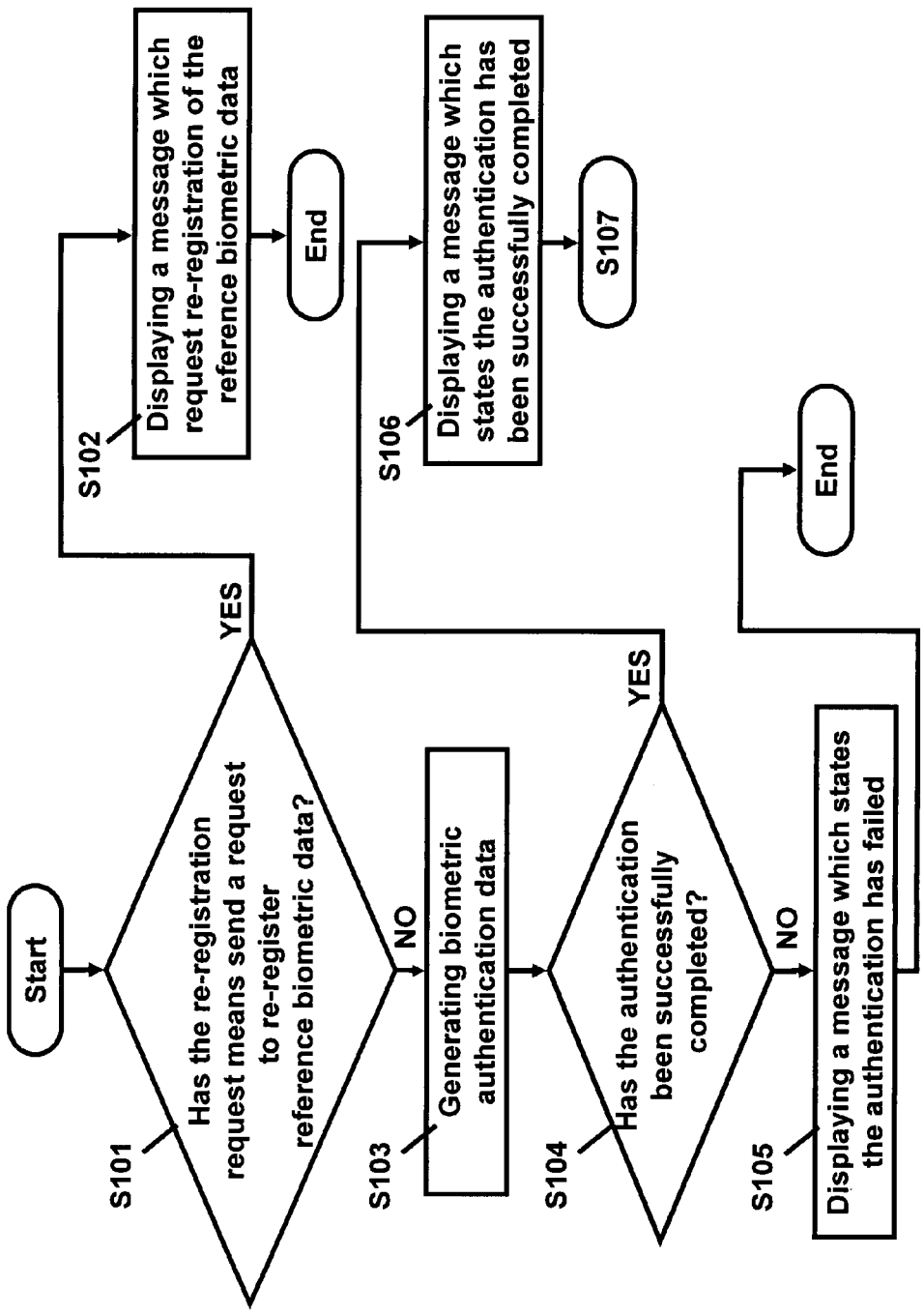
FIGS. 4A and 4B are flowcharts of the process of the first authentication.
Figure 4B:
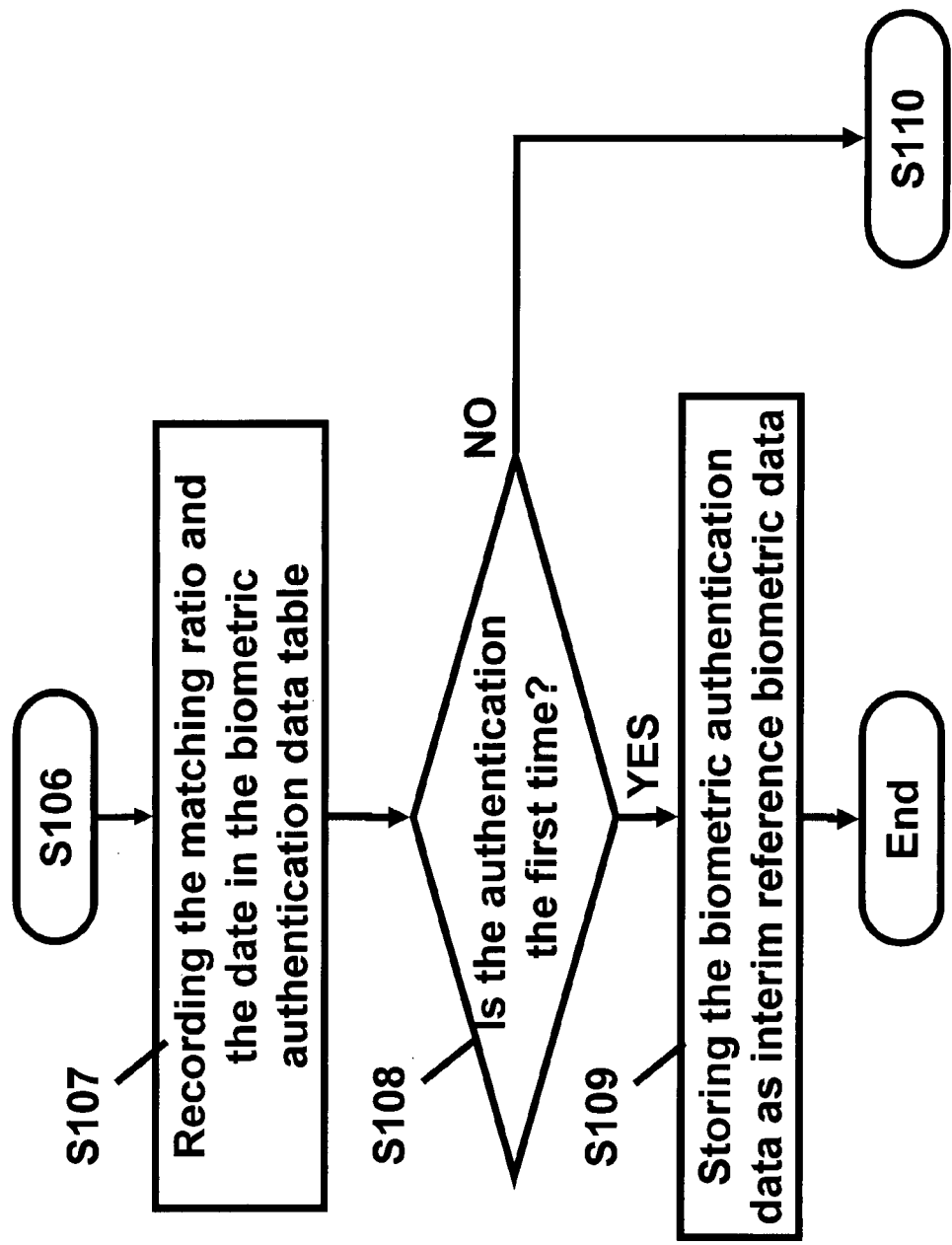
Figure 5:
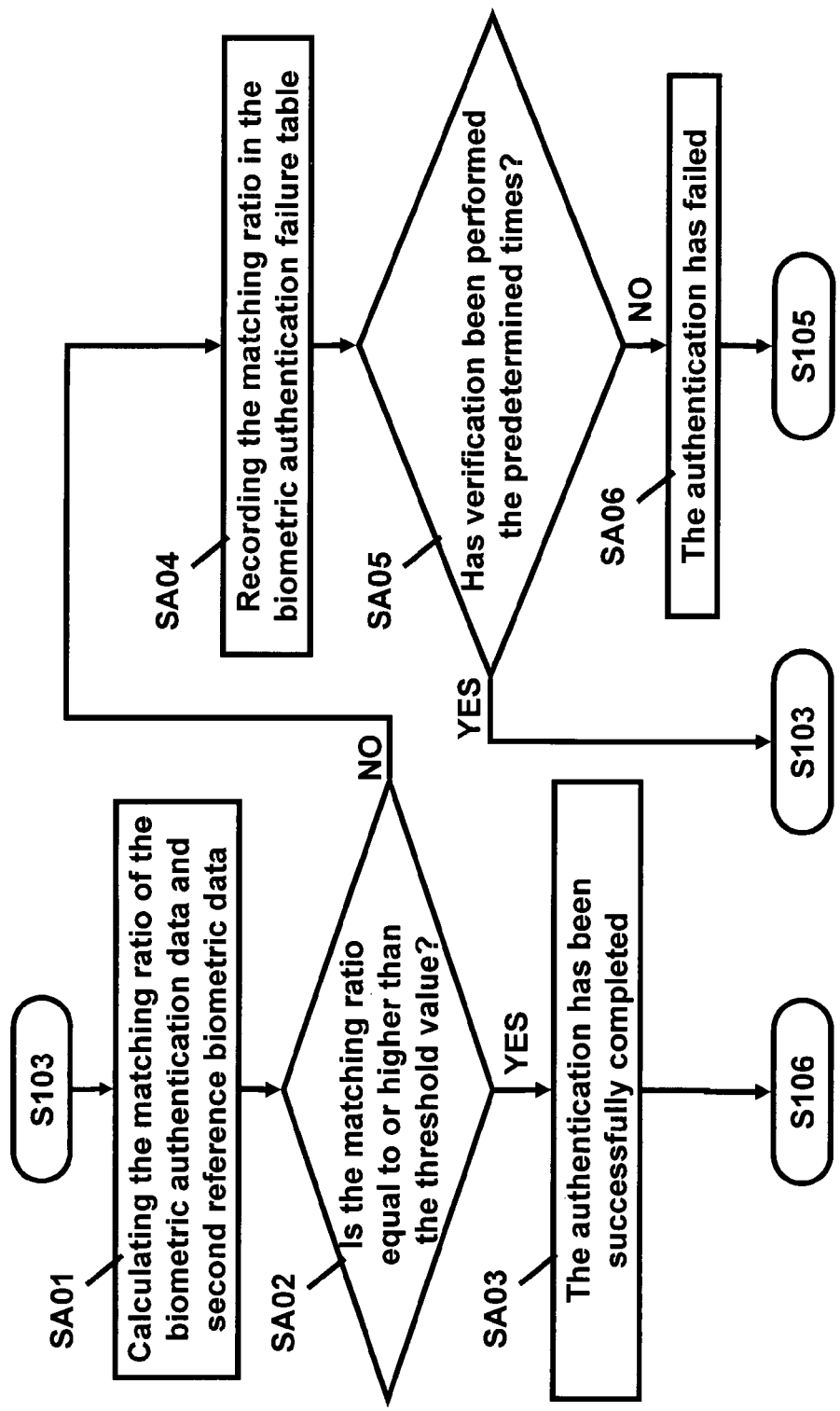
FIG. 5 is a detailed flowchart of the authentication process.

In step S107 in FIG. 4B, the authentication means 204 records the matching ratio calculated in step SA01 in FIG. 5 and the date when it is determined that the authentication has been successfully completed in the biometric authentication data table 300 so that the matching ratio is associated with the date. Then, the process proceeds to step S108.

In step S108, the authentication means 204 refers to the field of the number-of-authentication 402 in the biometric authentication data table 300 to obtain the number of times authentication was performed, and determines whether the authentication is the first authentication. When the authentication means 204 determines that the authentication is the first-authentication, the process proceeds to step S109. On the other hand, when the authentication means 204 determines that the authentication is not the first authentication, the process proceeds to step S110 in FIG. 6.

In step S109, the update-and-registration means 206 stores, as interim reference biometric data, the biometric authentication data generated by the biometric-authentication-data generating means 202 in step S103 in the external storage unit 114 (step 5 in FIG. 15). Then, the process is completed. The interim reference biometric data is candidate data for updating and registering the second reference biometric data in the second authentication.

Flow of Second Authentication

The process performed by the biometric authentication device when the user is authenticated for the second time will now be described with reference to FIGS. 5, 15, 16, and 17. In this case, it is assumed that the biometric authentication data generated by the biometric-authentication-data generating means 202 in the first authentication has been already stored as the interim reference biometric data in the external storage unit 114 (step 5 in FIG. 15), as described with reference to FIGS. 4A and 4B. It is assumed that steps S101 to S107 in FIG. 4B are performed when the second authentication is started. That is to say, in the second authentication, biometric authentication data generated by the biometric-authentication-data generating means 202 has been already stored in the external storage unit 114 (step 6 in FIG. 15). Furthermore, it is assumed that the matching ratio of the biometric authentication data and the second reference biometric data has been calculated (step 7 in FIG. 15), and it is determined that the authentication has been successfully completed. Furthermore, it is assumed that the authentication has been determined as being the second authentication in step S108 in FIG. 4B, and the process has proceeded to step S110.

In step S110, the authentication means 204 calculates the matching ratio of the biometric authentication data newly generated by the biometric-authentication-data generating means 202 in the second authentication and the interim reference biometric data generated in the first authentication (step 8 in FIG. 15). Then, the process proceeds to step S111.

In step S111, the update-and-registration means 206 compares the matching ratio calculated by the authentication means 204 in step S104 on the basis of the biometric authentication data and the second reference biometric data with the matching ratio calculated by the authentication means 204 in step S110 on the basis of the biometric authentication data and the interim reference biometric data. Then, the update-and-registration means 206 determines which of these matching ratios is higher. When the update-and-registration means 206 determines that the matching ratio calculated in step S104 is higher, the process proceeds to step S113 without the update-and-registration means 206 updating the second reference biometric data (step 9 in FIG. 16). Otherwise, the process proceeds to step S112. In this arrangement, one of the second reference biometric data and the interim reference biometric data, the matching ratio of the one and the biometric authentication data being higher, is to be a second reference biometric data that is used in the next authentication. Thus, even when it is determined, with the matching ratio being equal to the threshold value set by the user, that the authentication has been successfully completed, the second reference biometric data is not immediately updated with the generated biometric authentication data. Thus, the reliability of the second reference biometric data can be improved.

Figure 17:
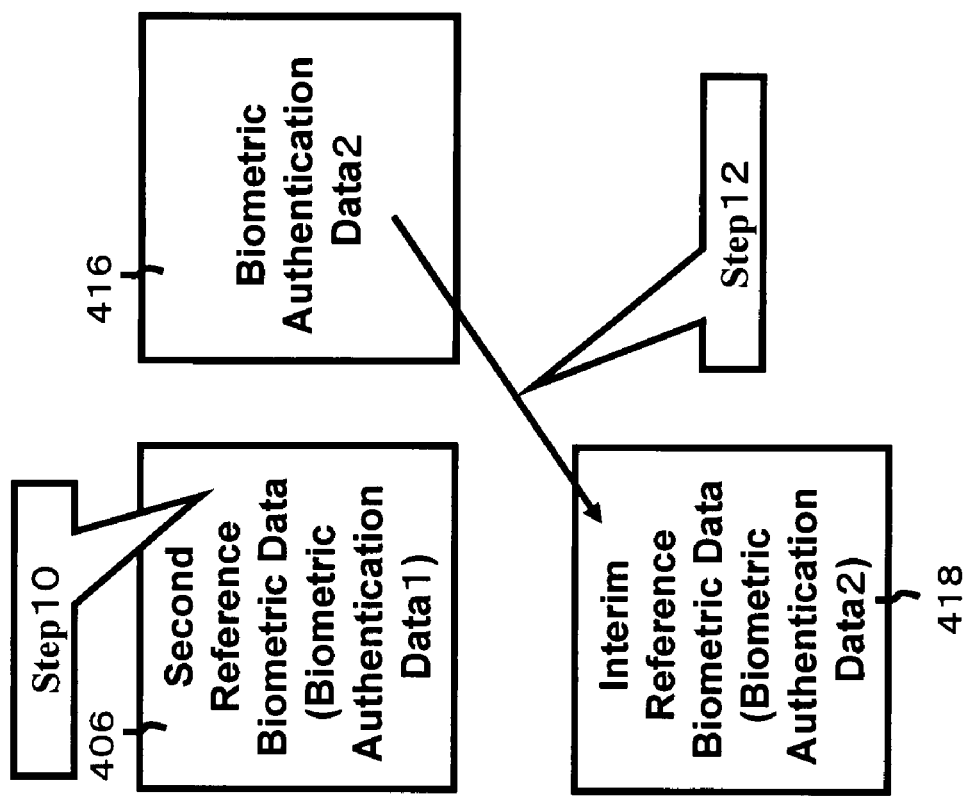
FIG. 17 is a third diagram showing the process of updating and registering the second reference biometric data.

In step S112, the update-and-registration means 206 updates the second reference biometric data with the interim reference biometric data (the biometric authentication data generated by the biometric-authentication-data generating means 202 in the first authentication) generated in step S109 in FIG. 4B and registers the updated second reference biometric data (step 10 in FIG. 17). In this arrangement, even when biometric data of the user varies with time, since the second reference biometric data is updated with the newly generated biometric authentication data, a decrease in the matching ratio can be suppressed. Then, the process proceeds to step S113.

Figure 16:
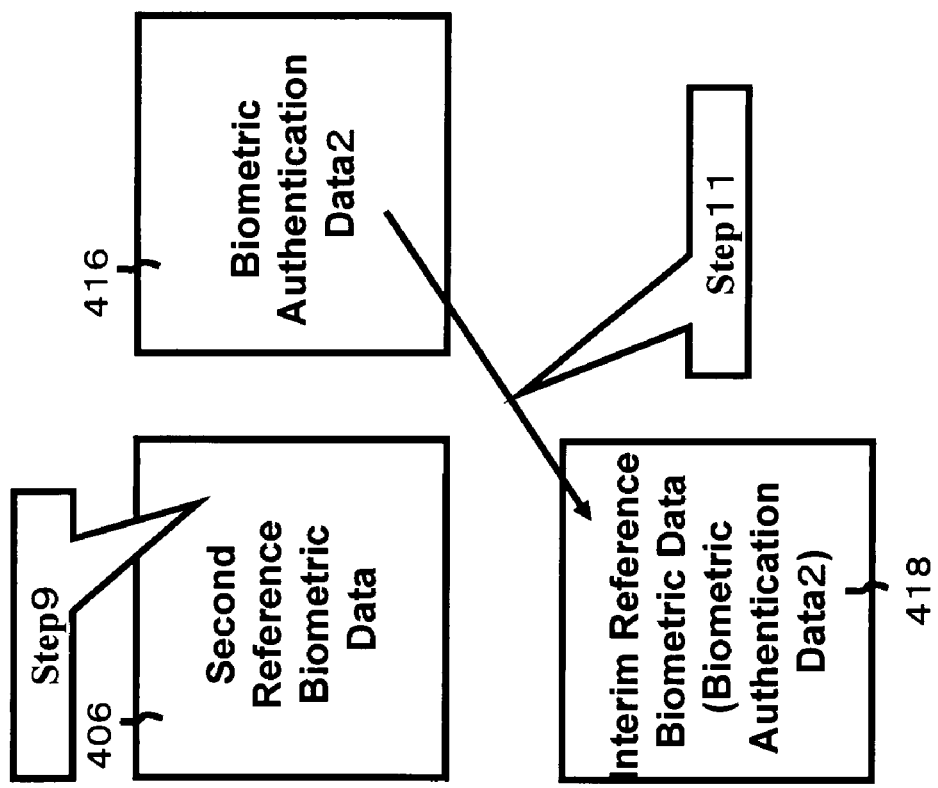
FIG. 16 is a second diagram showing the process of updating and registering the second reference biometric data.

In step S113, the authentication means 204 updates the interim reference biometric data with the biometric authentication data generated by the biometric-authentication-data generating means 202 in the second authentication and registers the updated interim reference biometric data (step 11 in FIG. 16 and step 12 in FIG. 17). Then, the process is completed. The interim reference biometric data is candidate data for updating and registering the second reference biometric data in the third authentication.

First Flow of Sending Re-Registration Notice

Figure 7:
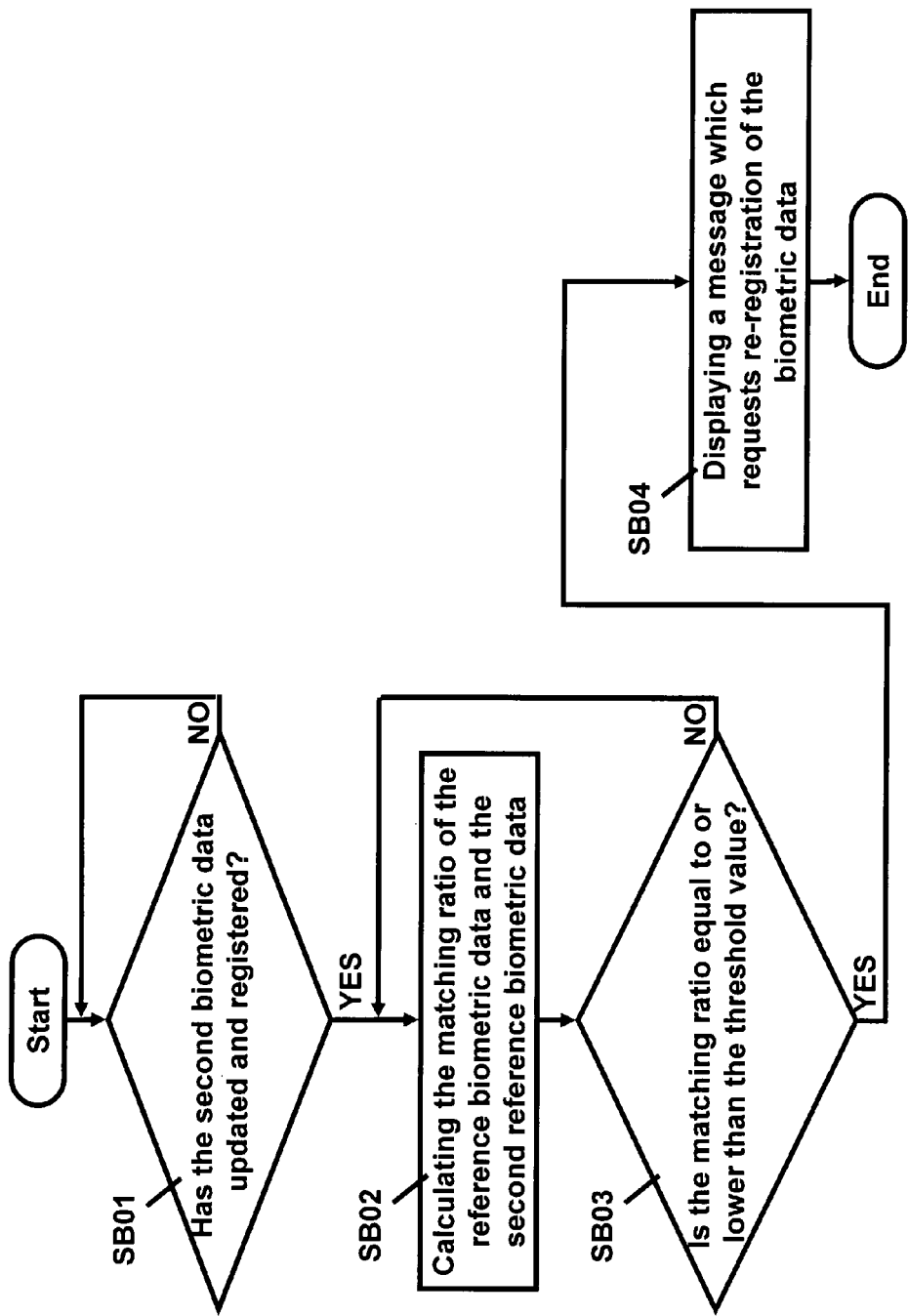
FIG. 7 is a detailed flowchart of a first process of sending a re-registration notice.

The process of sending a re-registration notice in step S101 in FIG. 4B will now be described in detail with reference to FIG. 7.

In step SB01, the re-registration request means 208 monitors the biometric authentication data table 300 and determines whether the update-and-registration means 206 has updated and registered the second reference biometric data. When the re-registration request means 208 determines that the update-and-registration means 206 has updated and registered the second reference biometric data, the process proceeds to step SB02.

In step SB02, the re-registration request means 208, with reference to the biometric authentication data table 300, calculates the reference-biometric-data matching ratio of the reference biometric data stored in the external storage unit 114 and the second reference biometric data updated and registered by the update-and-registration means 206, and records the reference-biometric-data matching ratio in the biometric authentication data table 300. Then, the process proceeds to step SB03.

In step SB03, the re-registration request means 208 compares the reference-biometric-data matching ratio calculated in step SB02 with a threshold value set by the user. When the reference-biometric-data matching ratio is found to be equal to or lower than the threshold value as the result of the comparison, the process proceeds to step SB04 where the user is requested to re-register the reference biometric data. It is preferable that the threshold value be equal to or higher than a value such that, when the reference-biometric-data matching ratio is equal to or lower than the value, it cannot be guaranteed that a genuine user, the reference biometric data of the user having been initially registered, is authenticated, and thus a risk that a stranger pretends to be the genuine user significantly increases. For example, in a case where it cannot be guaranteed that a genuine user, the reference biometric data of the user having been initially registered, is authenticated when the reference-biometric-data matching ratio is equal to or lower than 93.0%, the threshold value should be set to, for example, 95.0%.

In step SB04, the re-registration request means 208 sends instructions to the display unit 106 to display a message to request re-registration of the reference biometric data. Then, the process is completed. In this arrangement, when the second reference biometric data significantly differs from the reference biometric data, the user is requested to re-register the reference biometric data to guarantee that a genuine user, the reference biometric data of the user having-been initially registered, is authenticated. Thus, a stranger can be prevented from pretending to be a genuine user and being improperly authenticated. Furthermore, a case can be avoided where the amount of the second reference biometric data decreases as a result of repeatedly determining, with the matching ratio being equal to the threshold value because the way the user holds the palm over the input unit 112 is inappropriate, that authentication is successfully completed.

Second Embodiment

Flow of Nth Authentication

In the flow of the second authentication in the first embodiment, when the matching ratio of the biometric authentication data and the interim reference biometric data is higher than the matching ratio of the biometric authentication data and the second reference biometric data, the second reference biometric data is updated with the interim reference biometric data and the updated second reference biometric data is registered. Alternatively, another arrangement may be adopted. The other arrangement will now be described in detail with reference to FIGS. 8 and 9. In the description of the other arrangement, in order to generalize the description, it is assumed that the authentication flow is the nth authentication flow, where n is a natural number that is equal to or more than two.

Figure 8:
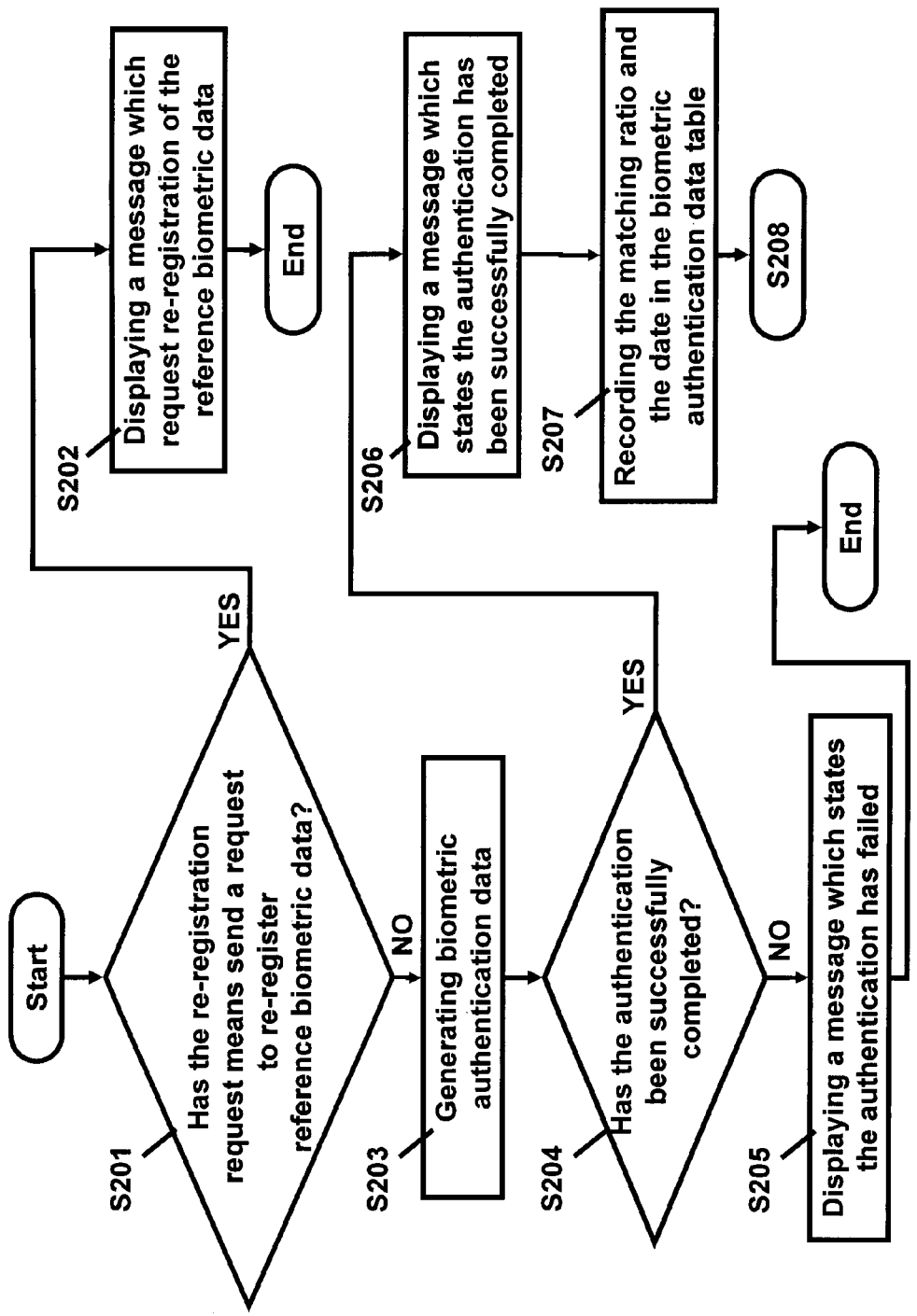
FIG. 8 is a first flowchart of the nth authentication.

Since steps S201 to S207 in FIG. 8 are the same as the corresponding steps in FIGS. 4A and 4B except in that the number of authentication is n, the description of these steps is omitted here. The process performed by the re-registration request means 208 in step S201 is described below with reference to FIG. 10.

In step S208, the authentication means 204 calculates the matching ratio of biometric authentication data newly generated by the biometric-authentication-data generating means 202 in the nth authentication and interim reference biometric data generated by the biometric-authentication-data generating means 202 in the (n−1)th authentication. Then, the process proceeds to step S209.

In step S209, the update-and-registration means 206 compares the matching ratio calculated by the authentication means 204 on the basis of the biometric authentication data and the second reference biometric data with the matching ratio calculated by the authentication means 204 on the basis of the biometric authentication data and the interim reference biometric data, and determines which of these matching ratios is higher. When the update-and-registration means 206 determines that the matching ratio calculated on the basis of the biometric authentication data and the second reference biometric data is higher, the process proceeds to step S212. Otherwise, the process proceeds to step S210.

In step S210, the update-and-registration means 206 determines whether the matching ratio calculated by the authentication means 204 in the nth authentication is equal to or lower than a threshold value set by the user. When the update-and-registration means 206 determines that the matching ratio is equal to or lower than the threshold value, the process proceeds to step S211. Otherwise, the process proceeds to step S212.

In step S211, the update-and-registration means 206 updates the second reference biometric data with the interim reference biometric data and registers the updated second reference biometric data. Then, the process proceeds to step S212. FIG. 13 shows an example of the biometric authentication data table 300 according to the second embodiment. In FIG. 13, it is assumed that, when the matching ratio is lower than 99.0%, it is determined that authentication has failed. The update-and-registration means 206 did not update and register the second reference biometric data until the matching ratio becomes 99.0% in the fifth authentication. Then, when the matching ratio is lower than 99.0%, the update-and-registration means 206 updates and registers the second reference biometric data. Furthermore, when the matching ratio is again 99.0% in the eighth authentication, the re-registration request means 208 requests the user to re-register the reference biometric data and re-registers the reference biometric data.

In step S212, the authentication means 204 updates the interim reference biometric data with the biometric authentication data generated by the biometric-authentication-data generating means 202 in the nth authentication and registers the updated interim reference biometric data. Then, the process is completed. The updated interim reference biometric data is candidate data for updating and registering the second reference biometric data in the (n+1)th authentication.

Second Flow of Sending Re-Registration Notice

In the first flow of sending a re-registration notice according to the first embodiment, the user is requested to re-register reference biometric data on the basis of the reference-biometric-data matching ratio of the reference biometric data and corresponding second reference biometric data. Alternatively, another arrangement may be adopted. A process will now be described with reference to FIG. 10. The process is performed by the re-registration request means 208, for example, when the rate of change of the matching ratio from the first authentication to the third authentication is higher than that in FIG. 13, as shown in FIG. 14.

In step SC01, the re-registration request means 208 monitors the biometric authentication data table 300 and determines whether the authentication means 204 has newly recorded a matching ratio and a corresponding date when it is determined that authentication has been successfully completed in the biometric authentication data table 300 so that the matching ratio is associated with the date. When the re-registration request means 208 determines that the authentication means 204 has newly recorded a matching ratio and a corresponding date when it is determined that authentication has been successfully completed so that the matching ratio is associated with the date, the process proceeds to step SC02.

In step SC02, the re-registration request means 208 calculates the rate of change of the matching ratio from the matching ratio and the corresponding date newly recorded by the authentication means 204 and the matching ratio and the corresponding date recorded by the authentication means 204 the last time in the biometric authentication data table 300. The user can freely set a base for calculating the rate of change of the matching ratio. For example, instead of the matching ratio and the corresponding date recorded the last time, the matching ratio and the corresponding date recorded the last but one time may be used as the base for calculating the rate of change of the matching ratio. After step SC02, the process proceeds to step SC03.

In step SC03, the re-registration request means 208 compares the rate of change of the matching ratio calculated in step SC02 with a threshold value set by the user. When the rate of change of the matching ratio is found to be equal to or higher than the threshold value as the result of the comparison, the process proceeds to step SC04 where the user is requested to re-register the reference biometric data. It is preferable that the threshold value be lower than a value such that, in a case where the biometric data varies with time according to the rate of change of the matching ratio that is equal to the value, when the reference biometric data is not re-registered, it cannot be guaranteed that a genuine user, reference biometric data of the user having been initially registered, is authenticated, and thus a risk that a stranger pretends to be the genuine user significantly increases. For example, when it cannot be guaranteed that a genuine user, the reference biometric data of the user having been initially registered, is authenticated in a case where the rate of change of the matching ratio per week is 0.7% and the biometric data varies with time according to this rate of change, the threshold value should be set to, for example, 0.5%.

In step SC04, the re-registration request means 208 sends instructions to the display unit 106 to display a message to request re-registration of the reference biometric data. In this arrangement, the rate of change of the biometric data of the user over time can be estimated from the rate of change of the matching ratio. Thus, an arrangement can be adopted, in which, on the basis of the rate of change of the matching ratio, the user is requested in advance to re-register the reference biometric data. Accordingly, the user can take necessary action, for example, re-registration of the reference biometric data, before it is determined that authentication has failed due to a change in the biometric data over time.

The aforementioned embodiments are illustrations for facilitating the understanding of the present invention and do not restrict other embodiments. Thus, the embodiments can be modified without departing from the gist of the present invention. For example, when the authentication means determines that authentication has been successfully completed on the basis of the calculated matching ratio of biometric authentication data and second reference biometric data and when the matching ratio is equal to or lower than a predetermined value, the update-and-registration means may update and register the reference biometric data and the second reference biometric data with the biometric authentication data. In this arrangement, the frequency of causing troubles to the user because of authentication failure due to a change in biometric data over time can be decreased.

What is claimed is:

1. A biometric authentication device for generating biometric data on the basis of biometric information of a user and for authenticating the user on the basis of a reference biometric data of the user, the biometric authentication device comprising:

a storage unit for storing the reference biometric data and working reference biometric data; and a central processing unit for controlling a process of maintaining reference biometric data to be carried out by the biometric authentication device, the process comprising:

initializing the working reference biometric data by copying the reference biometric data;

obtaining new biometric data on the basis of new biometric information;

performing authentication by comparison of said new biometric data with said working reference biometric data, and upon successful authentication, updating the working reference biometric data by copying said new biometric data;

calculating a matching ratio of the reference biometric data and the updated working reference biometric data; and urging the user to carry out registration of reference biometric data when the matching ratio is equal to or lower than a predetermined value.

2. The biometric authentication device of claim 1, wherein said process further comprises repeating steps of obtaining new biometric data and performing authentication until the matching ratio becomes equal to or lower than the predetermined value.

3. The biometric authentication device of claim 1, wherein the calculating calculates a second matching ratio of biometric data generated in the preceding authentication and said new biometric data; and the updating updates the working reference biometric data by copying said biometric data obtained in the preceding authentication when the second matching ratio is higher than the matching ratio.

4. The biometric authentication device of claim 1, wherein the updating updates when the matching ratio is equal to or lower than a predetermined value.

5. The biometric authentication device of claim 1, the calculating calculates a changing rate of the matching ratio on the basis of the matching ratio and a corresponding date recorded in the matching ratio calculation; and the urging urges when said changing rate is equal to or higher than a predetermined value.

6. A maintaining method of reference biometric data, the method comprising:

storing the reference biometric data and working reference biometric data;

initializing the working reference biometric data by copying the reference biometric data;

obtaining new biometric data on the basis of new biometric information;

performing authentication by comparison of said new biometric data with said working reference biometric data, and upon successful authentication, updating the working reference biometric data by copying said new biometric data;

calculating a matching ratio of the reference biometric data and the updated working reference biometric data; and urging the user to carry out registration of reference biometric data when the matching ratio is equal to or lower than a predetermined value.

7. The maintaining method of reference biometric data of claim 6, further comprising repeating steps of obtaining new biometric data and performing authentication until the matching ratio becomes equal to or lower than the predetermined value.

8. The maintaining method of reference biometric data of claim 6, wherein the calculating calculates a second matching ratio of biometric data generated in the preceding authentication and said new biometric data; and the updating updates the working reference biometric data by copying said biometric data obtained in the preceding authentication when the second matching ratio is higher than the matching ratio.

9. The maintaining method of reference biometric data of claim 6, wherein the updating updates when the matching ratio is equal to or lower than a predetermined value.

10. The maintaining method of reference biometric data of claim 6, the calculating calculates a changing rate of the matching ratio on the basis of the matching ratio and a corresponding date recorded in the matching ratio calculation; and the urging urges when said changing rate is equal to or higher than a predetermined value.

11. A computer-readable recording medium that stores a computer program for maintaining reference biometric data by controlling a biometric authentication device according to a process comprising:

storing the reference biometric data and working reference biometric data;

initializing the working reference biometric data by copying the reference biometric data;

obtaining new biometric data on the basis of new biometric information;

performing authentication by comparison of said new biometric data with said working reference biometric data, and upon successful authentication, updating the working reference biometric data by copying said new biometric data;

calculating a matching ratio of the reference biometric data and the updated working reference biometric data; and urging the user to carry out registration of reference biometric data when the matching ratio is equal to or lower than a predetermined value.

12. The computer-readable recording medium of claim 11, wherein said process further comprises repeating steps of obtaining new biometric data and performing authentication until the matching ratio becomes equal to or lower than the predetermined value.

13. The computer-readable recording medium of claim 11, wherein the calculating calculates a second matching ratio of biometric data generated in the preceding authentication and said new biometric data; and the updating updates the working reference biometric data by copying said biometric data obtained in the preceding authentication when the second matching ratio is higher than the matching ratio.

14. The computer-readable recording medium of claim 11, wherein the updating updates when the matching ratio is equal to or lower than a predetermined value.

15. The computer-readable recording medium of claim 11, the calculating calculates a changing rate of the matching ratio on the basis of the matching ratio and a corresponding date recorded in the matching ratio calculation; and the urging urges when said changing rate is equal to or higher than a predetermined value.

\* \* \* \* \*